April 29, 1941.  C. B. VICKERS  2,239,866
HYDRAULIC POWER UNIT
Filed Aug. 11, 1938
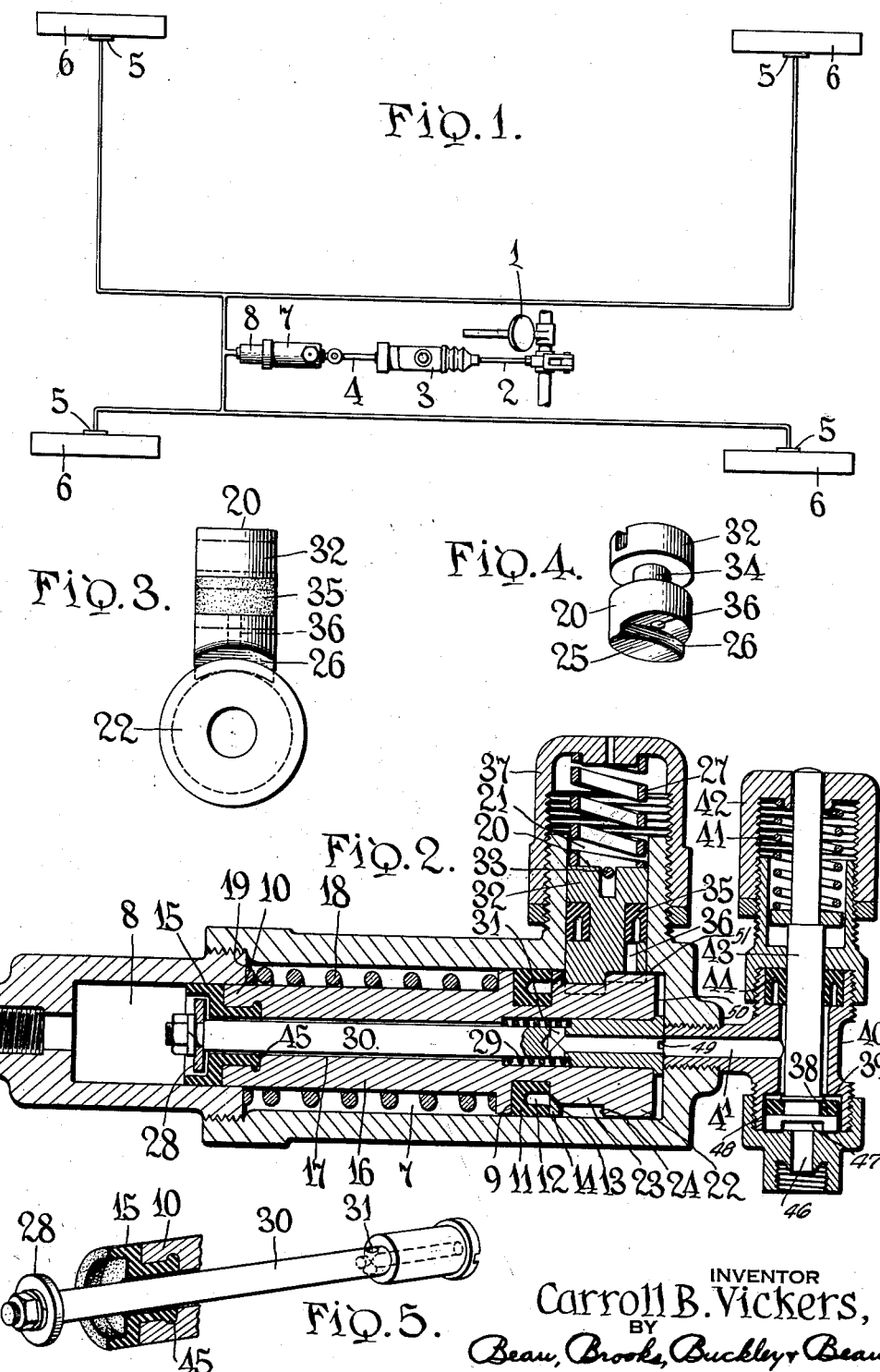
INVENTOR
Carroll B. Vickers,
BY
Bean, Brooks, Buckley & Bean
ATTORNEYS Patented Apr. 29, 1941

2,239,866

UNITED STATES PATENT OFFICE 2,239,866

HYDRAULIC POWER UNIT

Carroll B. Vickers, Kenmore, N. Y., assignor to Vickers Manufacturing Corporation, Buffalo, N. Y.

Application August 11, 1938, Serial No. 224,322

8 Claims. (Cl. 60—54.5)

This invention relates to a fluid power-multiplying unit and system and is applicable to the hydraulic brake systems of motor vehicles, presses, and other machines in which an initial movement of a work performing part is desired to set such part in a predetermined position, or against an article, and subsequently augmenting the force applied to said part for accomplishing the desired result. Devices of this nature have heretofore been proposed but their designs have been objectionable for practical reasons and their operation inefficient.

The present invention has for its object to provide a hydraulic system embodying a power-multiplying unit which will function in an efficient manner and be practical in design.

The invention further has for its object to provide a simplified and durable unit in which the multiplying device or mechanism is normally retained inoperative and released in response to the fluid pressure in the system attaining a predetermined degree.

In the accompanying drawing

Fig. 1 is a diagrammatic illustration of a hydraulic brake system for motor vehicles embodying the present invention;

Fig. 2 is a longitudinal sectional view of the power-multiplying unit;

Fig. 3 is an end elevation of the larger piston and its locking member;

Fig. 4 is a perspective view of the locking member; and

Fig. 5 is an exploded perspective view of the trapping valve assembly.

Referring more particularly to the drawing, the invention is illustrated as being incorporated in the hydraulic brake system of a motor vehicle. In the drawing the numeral 1 designates the brake pedal of a motor vehicle which is connected by suitable linkage 2 to the plunger (not shown) of a master cylinder 3. This arrangement of parts comprises generally a force applying unit so that when the pedal 1 is depressed by the foot, the body of liquid confined in the master cylinder will be subjected to pressure which is transmitted through a conduit 4 to a brake or work unit, generally indicated at 5, for applying the brake 6.

Interposed in the fluid or hydraulic line is a multiplier unit which comprises a cylinder 7 and a relatively smaller cylinder 8. Within these two cylinders which are co-axially arranged, operates a differential or compound piston member having a larger piston 9 moving in the larger cylinder and a smaller piston 10 moving in the smaller cylinder. The larger piston is provided with a packing ring 11 having a channel 12 opening rearwardly toward orifices 13 in a retaining flange 14 so that the motivating liquid might enter the channel through the orifices and expand the ring to more effectively seal the piston in the cylinder. The smaller piston has a cup packing member 15 to seal the clearance between the piston and the cylinder wall. The side walls of the two cylinders which are traversed by the piston are imperforate, and consequently the piston packings may be of soft rubber to better seal the liquid against leakage. The two pistons are joined by a tubular body 16 which provides a bore 17 opening through the opposite ends of the differential piston member for direct communication between the force applying unit 3 and the work unit 5. Normally the differential piston member is held by a spring 18 against the back end wall of cylinder 7, the spring being compressed in the cylinder at the front side of the larger piston between the latter and the shoulder 19 at the juncture of the two cylinders.

Compressive movement of the plunger in the master cylinder will force the liquid through the piston passage 17, out in front of the smaller piston and into the work unit for a direct transmission of force to initially set the brake, when applied to a brake system, or to initially set the work performing part, when applied to a press or other machine. This initial pressure is predetermined and during the initial operation the differential piston unit is locked by a member 20 against movement until this pressure is substantially reached. This locking member operates in a chamber 21 extending laterally from the cylinder 7 at a point beyond the rearmost limit of movement of the larger piston, and the latter is provided with a rearwardly projecting lock engaging head 22 which is slidably guided by the cylinder walls and is joined to the piston body by a neck 23, thereby providing a shoulder 24. The locking member has an arcuate face 25, shaped on the same radius as the periphery of the head, and an adjacent shoulder 26 which normally engages shoulder 24 under the urge of a backing spring 27. The interengagement of the two shoulders provides a surface contact which is evenly broken throughout the extent of contact upon the radial retraction of the lock by reason of the similarity of curvature between the two interengaging parts. After withdrawal of the lock the larger piston will move forward under the fluid pressure and against the urge of its spring. During the initial portion of this movement a valve 28, preferably under the urge of a light spring 29, closes the passage 17 through the piston member to trap the liquid in the fluid line ahead of the smaller piston so that, as the pressure continues to be transmitted from the master cylinder to the larger piston of the force multiplier unit, the action of the smaller piston will multiply the force as applied to the work unit to expeditiously accomplish the function desired without proportionately increasing the effort applied by the foot on the pedal 1.

It is to be noted that the force is transmitted directly from the plunger of the master cylinder to the work unit by a solid and uninterrupted body of liquid until the differential piston is released and thereafter the valve 28 will close to trap the liquid in front of the smaller piston. This permits all slack and play in the system to be absorbed before the change-over to the multiplication stage is made.

Means are provided to relieve the hydraulic system of the setting pressure when the force applying unit is relieved of the foot pressure. In the present showing this is accomplished by a stem 30 which unseats the valve when the spring 18 returns the differential piston member to its normal position against the end wall of the cylinder. This stem is bored, as at 31, to permit through passage of the liquid and is urged rearwardly beyond the rear face of the head 22 for a sufficient distance to engage the end wall of the cylinder 7 as an abutment for lifting the valve. The stem, therefore, serves to hold the valve normally off its seat against the action of the spring so as to relieve all parts of the system from abnormal pressure and to open communication between the work unit and the force applying unit. When the unit is embodied in a brake system, the stem 30 may project from the piston 9 approximately $\frac{1}{32}$" and, therefore, the piston will only move such small distance before the valve closes and the force multiplier unit becomes wholly effective. This will materially conserve the travel of the pedal when the brakes are applied. For other machines the valve movement may be increased to insure proper initial movement of the work performing part.

From the normal condition in which there is no pressure in the system an application of force to the foot pedal builds up a predetermined pressure in the system. Until this predetermined pressure is attained there is a direct transmission of pressure in the system and as the predetermined pressure is exceeded the engagement between the piston and the latch will be broken, thereby permitting the piston to move relative to the valve until the packing 15 seats thereagainst for trapping the liquid ahead of it. Further depression of the pedal will then multiply the force applied to the brakes in inverse proportion to the area of the cylinders. This change-over from the direct transmission of force is established quickly and in accordance with the movement of the piston to seat the valve.

Upon an increase of pressure in the larger cylinder, due to application of more force to the brake pedal, the latch can rise until it is stopped by the guide pin 33 and as the pressure in the large cylinder is lowered the latch will move downwardly until it again rides upon the piston. While the relative sizes of the larger and smaller pistons are preferably such as to provide the above pressure ratio when the valve 28 seats it should be understood that their sizes may be changed to vary the ratio.

The withdrawal of the lock is pressure determined and for this purpose the lock is provided with a piston 32 operating in the chamber 21 and on which the spring 27 rests. A pin 33 holds the locking shoulder 26 in proper alignment with the shoulder 23 so as to insure interengagement of said shoulders when the pressure is relieved in the system and the head 22 is returned to its normal position at the rear of the cylinder 7. The piston is connected to the locking member 20 by a stem 34 around which fits a rubber packing member 35 of channeled formation with the channel opening toward the locking member in communication with a port 36 which transmits the pressure from chamber 7 into the channeled packing 35 for exerting pressure outwardly on the piston 32 to thereby retract the shoulder 26 from the path of shoulder 24. The tension of spring 27 may be regulated by adjusting the threaded cap 37 which encloses the spring.

In view of the fact that an exceedingly high pressure is developed by the multiplying unit, and consequently may rupture the conduit 4, means are provided to restrict the pressure built up within the limits of the shaft. For this purpose an automatic pressure responsive valve 38 is inserted in the pressure line between the master cylinder and the multiplying unit although it may be located at some other suitable point if desired. The valve is designed to engage a seat 39 in a case 40 against the resilient urge of spring 41 which is adjustable by a cap 42 threaded on the casing. The valve is provided with a stem 43 extending through the cap and also through a packing ring 44 between which latter and the seat 39 communication is had with the chamber 7, as indicated at 4' in Fig. 2. By this arrangement a pressure differential may be built up between the hydraulic line and the atmosphere so that when the hydraulic pressure from the master cylinder approaches or reaches a predetermined degree, it will seat the valve 38 against the urge of spring 41 and prevent further pressure build-up against the larger cylinder 9 in chamber 7.

In operation, the pedal is depressed to place the liquid in the line 4 under pressure. The valve 38 being normally opened will permit the liquid to flow through valve port 46 and the transverse passage 47 in the valve body, thence about the valve by reason of the clearance 48, over the valve seat 39, and into the passage 4' from whence the liquid will pass on through the stem bore 31 and piston bore 17 out into the smaller cylinder 8 and on into the brake units 5. As the fluid pressure builds up under the depressing action of the pedal the liquid will also flow through radial passages 49 into the space 50 between the piston head 22 and the rear wall of the cylinder 7, filling such space and passing about the head by reason of the clearance 51 and through the port 36 for exerting pressure outwardly on the piston 32. The foot pressure will be directly transmitted through the entire system until the hydraulic pressure overcomes the spring 27, which latter has been set at a given adjustment for a predetermined degree of pressure. As soon as this predetermined pressure is reached the spring will yield as the piston 32 recedes in its lock-withdrawing movement. When the locking member 20 is retracted sufficiently to release the head 22 the fluid pressure acting on the rear face of the head will urge the differential piston forwardly against the urge of its spring 18. During the initial movement of the differential piston the valve 28 will remain fixed by reason of its spring 29 holding the stem against the back wall of cylinder 7. However, when the differential piston has moved sufficiently to engage the cup packing 15 with the valve 28 the fluid in advance of the smaller piston will be trapped against escape and subjected to a relatively higher pressure for applying the brakes.

When the pedal 1 is relieved of the foot pressure the spring 18 will return the differential piston rearwardly in chamber or cylinder 7 and during the final portion of such movement the protruding valve stem 30 will engage the back wall of the larger cylinder and unseat the valve 28 for normally opening the entire system to the direct transmission of force when next applied to the pedal.

The invention has a wide field of usage in which the first multiplying unit is desirable after a preliminary setting of the work performing element. If desired, the cup packing member 15 may be secured by having its tubular anchoring sleeve beaded, as at 45 to interlock with a similarly shaped recess in the wall of the bore 17.

It will also be observed that the change-over from the direct to the multiplied transmission of force is made in a smooth and even manner without sudden or abrupt action detrimental to the system. The piston packing members are preferably of soft rubber for more efficiently sealing against fluid leakage. This is permissible in the construction set forth since the packing does not pass over any lateral ports into which the liquid pressure might force it. The cylinder walls are imperforate, the direct communication between the work unit and the force applying unit being through the differential piston member. The liquid pressure in the master chamber is consequently directed through the piston member as well as against the rear face of the larger piston, and when the check valve 28 closes the motivating fluid pressure is already being applied to the larger piston so as to uninterruptedly continue the piston movement for a steady operation of the work performing part. However, the check valve will not close until the piston begins its movement which is prevented by the locking member 20 until the general pressure in the entire system has reached that degree necessary to initially apply the brakes and then withdraw the locking member.

It will be understood that the apparatus and system described and shown herein is merely illustrative of the inventive principles involved which may be applied to other physical embodiments without departing from the scope and spirit of the invention claimed, and while the pistons are of the sliding type it is intended by this term to include any equivalent means.

What is claimed is:

1. A hydraulic power system comprising a force applying unit including means for applying pressure to a confined body of liquid, a work unit including relatively movable piston and cylinder elements, the cylinder element being in line communication with the body of liquid whereby operation of the force applying unit will subject the liquid to a predetermined pressure for actuating the work unit to initially set the movable element of the latter with a predetermined force, and a force multiplier unit interposed in the communicating line and comprising a differential piston member having an opening therethrough to provide for such direct communication between the first and second units, means for closing the opening by and during movement of the piston member, and means for locking the piston member against movement up to said predetermined pressure and operable thereafter automatically to release the piston member.

2. A hydraulic power system comprising a force unit, a work unit, and a force multiplier unit interposed between the first two units in liquid communication therewith, said force multiplier unit normally providing direct communication between the first two units whereby upon operation of the first unit the confined body of liquid will directly transmit the force to the work unit to initially set the same, means yieldably holding the force multiplier unit in its normally inoperative position, means in the multiplier unit for interrupting the direct communication by and during operation of such multiplier unit from its inoperative position, and means mechanically engaged with the multiplier unit when the latter is in its inoperative position for normally arresting operation of said multiplier unit against the yieldable means, said engaging means having a part responsive to the hydrostatic pressure of a predetermined value to disengage said engaging means from the multiplier unit to permit movement of the latter by the fluid pressure.

3. A hydraulic power unit comprising relatively larger and smaller cylinders having imperforate side walls, a piston in each cylinder connected for movement in unison, a soft rubber packing for each piston, means providing direct communication through the connected pistons, a valve for closing said communicating means upon movement of the connected pistons in unison, and a locking member normally holding the larger piston against movement and responsive to a predetermined pressure to release the larger piston for driving the smaller piston.

4. A hydraulic power unit comprising relatively larger and smaller cylinders having imperforate side walls, a piston in each cylinder connected for movement as a unit, a packing for each piston, means providing communication through the connected pistons, a valve for closing said communicating means upon movement of the connected pistons in unison, a chamber opening into one of the cylinders at a point not traversed by either piston, a locking member engageable with the unit to normally hold the latter against movement, and pressure responsive means operable to render the locking member inoperative.

5. A hydraulic power unit comprising coaxially arranged cylinders of different diameters adapted to be interposed in a liquid line of communication between force applying means and a work unit, a differential piston member operable in the cylinders and comprising relatively larger and smaller pistons joined by a tubular body, each piston having a packing for making a fluid tight seal with the respective cylinder wall, said tubular body providing communication between the two cylinders at the remote sides of the two piston packings, a valve adapted to close the bore of the tubular member when the piston member is in its operative position, said valve having a part engageable with an abutment when the piston member is in its normally inoperative position to unseat the valve whereby direct communication is normally obtained through the piston member between the remote ends of the two cylinders, resilient means urging the piston member to cause said valve part to engage the abutment, and pressure releasable locking means engaging the piston member when in its inoperative position to secure the latter preliminarily against movement until the pressure build-up in the system attains a predetermined degree.

6. A hydraulic power unit comprising coaxially arranged cylinders of different diameters adapted to be interposed in a liquid line of communication between force applying means and a work unit, a differential piston member operable in the cylinders and having an opening therethrough providing communication between the two cylinders, valve means adapted to close the opening when the piston member is in its operative position, means yieldably holding the piston member in its inoperative position, pressure responsive means for locking the piston member inoperative until the pressure build-up in the line reaches a predetermined degree, and means for preventing the pressure build-up beyond a certain degree as a safety factor.

7. A hydraulic force multiplier unit having a compound cylinder, a differential piston member therein, a direct passage for by-passing liquid by the piston member, means for closing the passage during the initial portion of the piston movement, means for subjecting the liquid to pressure, means for mechanically locking the piston member against movement until a predetermined build-up in pressure is developed, and pressure responsive means for rendering the locking means inoperative to hold the piston member and thereby release the piston member for functioning.

8. A hydraulic power system comprising a force applying unit including means for applying pressure to a confined body of liquid, a work unit including relatively movable piston and cylinder elements, the cylinder element being in line communication with the body of liquid whereby operation of the force applying unit will subject the liquid to a predetermined pressure for actuating the work unit to initially set the movable element of the latter with a predetermined force, a force multiplier unit interposed in the communicating line and comprising a differential piston member having an opening therethrough to provide for such direct communication between the first and second units, means for closing the opening by and during movement of the piston member, means for locking the piston member against movement up to said predetermined pressure and operable thereafter automatically to release the piston member, and means responsive to a hydrostatic pressure higher than such predetermined pressure for closing the fluid line between the multiplier unit and the force applying unit whereby to prevent the pressure build up beyond a certain degree as a safety factor.

CARROLL B. VICKERS.